United States Patent [19]

Yasui et al.

[11] Patent Number: 4,870,609

[45] Date of Patent: Sep. 26, 1989

[54] HIGH SPEED FULL ADDER USING COMPLEMENTARY INPUT-OUTPUT SIGNALS

[75] Inventors: Ikuo Yasui; Yukihiko Shimazu; Toru Kengaku, all of Hyogo, Japan

[73] Assignee: Mitsubishi Denki Kabushiki Kaisha, Japan

[21] Appl. No.: 113,612

[22] Filed: Oct. 26, 1987

[30] Foreign Application Priority Data

Nov. 13, 1986 [JP] Japan .................................. 61-270693

[51] Int. Cl.[4] .............................................. G06F 7/52
[52] U.S. Cl. .................................................. 364/784
[58] Field of Search ......................... 364/784, 785, 786

[56] References Cited

U.S. PATENT DOCUMENTS

| | | | |
|---|---|---|---|
| 4,601,007 | 7/1986 | Uya et al. | 364/784 |
| 4,709,346 | 11/1987 | Henlin | 364/784 |
| 4,713,790 | 12/1987 | Kloker et al. | 364/784 |

FOREIGN PATENT DOCUMENTS 61-70636  4/1986  Japan .
61-183738  8/1986  Japan .

OTHER PUBLICATIONS

Henlin et al., "A 25 MHz 16 Bit x 16 Bit Pipelined Multiplier" CH2080-0/84/0000/0417$01.00 1984, IEEE, pp. 417–422.

Heller et al., "Custom and Semi-Custom Design Techniques" 1984 *IEEE International Solid-State Circuits Conference*, Feb. 22, 1984, pp. 16–17.

*Primary Examiner*—David H. Malzahn
*Attorney, Agent, or Firm*—Wolf, Greenfield & Sacks

[57] ABSTRACT

The operation speed of a full adder is increased by avoiding the necessity of forming the inverse signal for adder operation and deleting the time required for passing through an inverter.

17 Claims, 3 Drawing Sheets

Fig. 3

| INPUT | | | | OUTPUT | |
|---|---|---|---|---|---|
| A | Ā | B | B̄ | 1st XOR | 1st XNOR |
| 0 | 1 | 0 | 1 | 0 | 1 |
| 0 | 1 | 1 | 0 | 1 | 0 |
| 1 | 0 | 0 | 1 | 1 | 0 |
| 1 | 0 | 1 | 0 | 0 | 1 |

Fig. 4

| INPUT | | | | OUTPUT | |
|---|---|---|---|---|---|
| Cin | C̄in | 1st XNOR | 1st XOR | 2nd XOR | 2nd XNOR |
| 0 | 1 | 0 | 1 | 0 | 1 |
| 0 | 1 | 1 | 0 | 1 | 0 |
| 1 | 0 | 0 | 1 | 1 | 0 |
| 1 | 0 | 1 | 0 | 0 | 1 |

Fig. 5

| INPUT | | LINE | |
|---|---|---|---|
| A | B | (205) | (206) |
| 0 | 0 | 0 | 1 |
| 0 | 1 | Cin | C̄in |
| 1 | 0 | Cin | C̄in |
| 1 | 1 | 1 | 0 |

HIGH SPEED FULL ADDER USING COMPLEMENTARY INPUT-OUTPUT SIGNALS

FIELD OF THE INVENTION

The present invention relates to a full adder which operates at a high speed.

DESCRIPTION OF THE RELATED BACKGROUND ART

FIG. 1 is a diagram showing a conventional full adder of the type shown in Japanese patent public disclosure No. 70636/1986. In this diagram, A denotes an augend signal; $\overline{B}$ is an inverse signal of an addend signal; $C_{in}$ a carry-in signal; $TG_1$ to $TG_5$ transmission gate circuits; $INV_1$, $INV_2$, $INV_3$, $INV_{4a}$ and $INV_{4b}$ inverting amplifiers; $GK_1$ a carry signal generating circuit; 1, 3, 5, 7 and 9 terminals; and 101 a signal line.

The augend signal A is applied to the terminal 1. The $\overline{B}$ of the addend signal is applied to the terminal 3. The carry-in signal $C_{in}$ is applied to the terminal 5. The augend signal A and the inverse signal $\overline{B}$ of the addend signal are supplied to a circuit consisting of the transmission gate circuits $TG_1$ and $TG_2$ and inverting amplifiers $INV_1$ and $INV_2$, so that an exclusive NOR (hereinafter, abbreviated to XNOR) is obtained. The XNOR signal of the augend signal A and the inverse signal $\overline{B}$ of the addend signal and the carry-in signal $C_{in}$ applied to the terminal 5 are supplied to a circuit consisting of the transmission gate circuits $TG_3$ and $TG_4$ and the inverting amplifiers $INV_3$ and $INV_{4a}$, so that an exclusive OR (hereinafter, abbreviated to XOR) is obtained. The XOR is provided as a sum signal S to the terminal 7. The carry-in signal $C_{in}$ is modified into the inverse signal by the inverting amplifier $INV_{4b}$ and is delivered to the transmission gate circuit $TG_5$. The transmission gate circuit $TG_5$ is controlled by the XNOR signal formed by the augend signal A and the inverse signal $\overline{B}$ of the addend signal, together with the inverse signal of the XNOR signal formed by the inverting amplifier $INV_3$. When the gate circuit $TG_5$ is closed, the carry signal is produced by the carry signal generating circuit $GK_1$ in accordance with the augend signal A applied to the terminal 1 and the inverse signal $\overline{B}$ of the addend signal applied to the terminal 3. The inverse signal of the carry-in signal $C_{in}$ passing through the transmission gate circuit $TG_5$, or the carry signal generated by the carry signal generating circuit $GK_1$ is fed out to the terminal 9 as a carry-out signal $\overline{CO}$.

Consideration is now given to the case where the sum signal S is changed, for example, as the inverse signal $\overline{B}$ of the addend signal applied to the terminal 3 changes, while the augend signal A and carry-in signal $C_{in}$ applied to the terminals 1 and 5, respectively remain constant.

The inverse signal $\overline{B}$ of the addend signal is applied to the inverting amplifier $INV_2$ and inverted to become the addend signal B, and then the addend signal B and the inverse signal $\overline{B}$ of the addend signal are applied to two gate electrodes of the transmission gate circuits $TG_1$ and $TG_2$. Therefore, the change of the inverse signal $\overline{B}$ of the addend signal is delayed by the time required for it to pass through the inverting amplifier $INV_2$, whereby the opening/closing operation of the transmission gate circuits $TG_1$ and $TG_2$ is also delayed at the same rate. The signal on the line 101 changes in response to the changes to the opened/closed state of the transmission gate circuits $TG_1$ and $TG_2$. The signal on the line 101 is applied to the inverting amplifier $INV_3$ and inverted to become the inverse signal. This inverse signal and the signal on the line 101 are supplied to the gate electrodes of the transmission gate circuits $TG_3$ and $TG_4$. Thus, the change of the signal line 101 causes the change of the state of the transmission gate circuits $TG_3$ and $TG_4$ after the time delay allowed for passing through the inverting amplifier $INV_3$. The sum signal S changes in response to the change of the states of the transmission gate circuits $TG_3$ and $TG_4$.

In the foregoing conventional full adder, the inverse signal is formed in itself. Therefore, there is a problem in that the time taken to produce the inverse signal causes a delay in the adding operation.

SUMMARY OF THE INVENTION

In view of the foregoing problem, it is the object of the invention to provide a full adder which can operate at a high speed.

According to the present invention, there is provided a full adder comprising: a first circuit for receiving a pair of complementary addend signals and a pair of complementary augend signals and for generating a first exclusive OR signal and a first exclusive NOR signal; a second circuit for receiving the first exclusive OR signal, the first exclusive NOR signal, and a pair of complementary carry-in signals and for generating a second exclusive OR signal and a second exclusive NOR signal as a pair of complementary sum signals; first and second gate circuits for causing the pair of complementary carry-in signals to be passed or blocked in response to at least one of the first exclusive OR signal and the first exclusive NOR signal; and a carry signal generating circuit and a carry signal killing circuit for generating a carry generating signal and a carry killing signal, respectively, by using the pair of addend signals and the pair of augend signals when the first and second gate circuits are closed.

With such an arrangement, the exclusive OR and exclusive NOR of the pair of complementary addend signals and the pair of complementary augend signals are provided from the first circuit as the first exclusive OR signal and first exclusive NOR signal The exclusive OR and exclusive NOR of the first exclusive OR signal, the first exclusive NOR signal, and the pair of complementary carry-in signals are provided from the second circuit as the second exclusive OR signal and second exclusive NOR signal which are also fed out as a pair of complementary sum signals.

Further, the first and second gate circuits cause the pair of complementary carry-in signals to be passed or blocked in response to at least one of the first exclusive OR signal and the first exclusive NOR signal. When those transfer gate circuits are closed, the carry generating signal and carry killing signal are generated by the carry signal generating circuit and carry signal cancelling circuit.

BRIEF DESCRIPTION OF THE DRAWINGS

FIG. 3 is a table showing the relationships between inputs (A, $\overline{A}$) and (B, $\overline{B}$) to a level build-up circuit shown in FIG. 2 and outputs (the first XOR, the first XNOR) from the level build-up circuit;

FIG. 4 is a table showing the relationships between inputs ($C_{in}$, $\overline{C_{in}}$) and (the first XNOR, the first XOR) to a second circuit in FIG. 2 and outputs (the second XOR, the second XNOR) from the second circuit; and FIG. 5 is a table showing how the state of signal lines are changed by an augend signal and an addend signal.

DESCRIPTION OF PREFERRED EMBODIMENT

Figure 1:
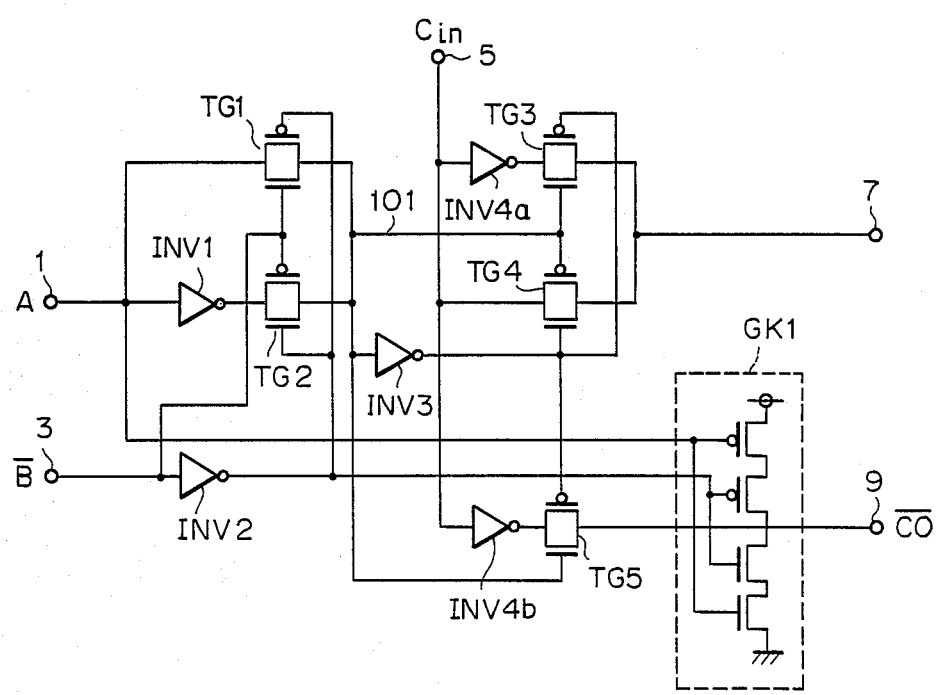
FIG. 1 is a schematic diagram of a conventional full adder.
Figure 2:
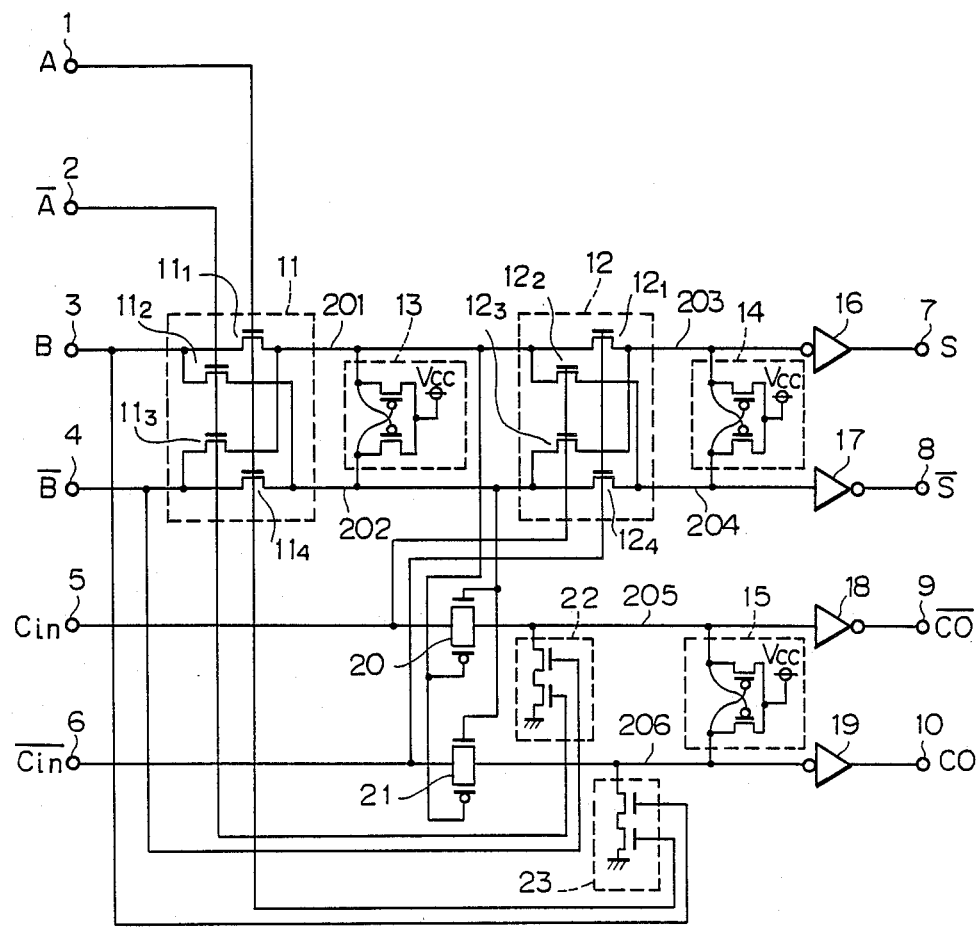
FIG. 2 is a schematic diagram showing an embodiment of a full adder according to the present invention.

FIG. 2 is a schematic diagram showing an embodiment of a full adder according to the present invention. In the diagram, those parts and components which are similar to those in FIG. 1 are designated by the same reference numerals. Numerals 2, 4, 6, 8 and 10 denote terminals; 11 and 12 indicate first and second circuits for forming the XOR and XNOR, respectively; 13 to 15 level build-up circuits; 16 to 19 inverting amplifiers; 20 and 21 transmission gate circuits as first and second gate circuits; 22 a carry signal cancelling circuit; 23 a carry signal generating circuit; and 201 to 206 signal lines. A power source potential $V_{cc}$ is set to logic "1" and a ground potential GND is set to a logic "0".

The augend signal A and its inverse signal $\overline{A}$ are respectively fed to the terminals 1 and 2 as a pair of complementary augend signals. An addend signal B and its inverse signal $\overline{B}$ are respectively fed to the terminals 3 and 4 as a pair of complementary addend signals. The pair of augend signals A and $\overline{A}$ and the pair of addend signals B and $\overline{B}$ are supplied to the first circuit 11. Thus, the first XNOR signal formed by the augend signal A and addend signal B is delivered on the signal line 201. The first XOR signal formed by the augend signal A and addend signal B is delivered on the signal line 202. The level build-up circuit 13 for assuring the "1" level is connected to the signal lines 201 and 202. FIG. 3 shows the relationships between inputs (A, $\overline{A}$) and (B, $\overline{B}$) to the level build-up circuit 13 and outputs (the first XOR, the first XNOR) therefrom.

As will be obvious from FIG. 2, each of the first and second circuits 11 and 12 comprises four MOS type transistors $11_1$–$11_4$ and $12_1$–$12_4$, respectively. The source electrodes of the first and second MOS type transistors $11_1$ and $11_2$ of the first circuit 11 are connected together to the terminal 3. The source electrodes of the third and fourth MOS type transistors $11_3$ and $11_4$ are connected together to the terminal 4. The drain electrodes of the transistors $11_1$ and $11_3$ are connected to the source electrodes of the first and second MOS type transistors $12_1$ and $12_2$ of the second circuit 12. The drain electrodes of the transistors $11_2$ and $11_4$ of the first circuit 11 are also connected to the source electrodes of the third and fourth MOS type transistors $12_3$ and $12_4$ of the second circuit 12. The drain electrodes of the transistors $12_1$ and $12_3$ are coupled to the line 203 and the drain electrodes of the transistors $12_2$ and $12_4$ are coupled to the line 204. The gate electrodes of the transistors $11_1$ and $11_4$ of the first circuit 11 are connected to the terminal 1 and the gate electrodes of the transistors $11_2$ and $11_3$ are connected to the terminal 2. The gate electrodes of the transistors $12_2$ and $12_3$ are connected to the terminal 5 and the gate electrodes of the transistors $12_1$ and $12_4$ are connected to the terminal 6.

Each of the level build-up circuits 13 to 15 comprises two PMOS type transistors. Their source electrodes are connected to the power source potential $V_{cc}$ and the gate electrodes are connected to the drain electrodes of the other transistors. The drain electrodes are coupled to connecting terminals.

The operation of the level build-up circuits 13 to 15 will now be described. When one connecting terminal is the ground potential GND, the PMOS type transistor whose gate electrode is connected to this connecting terminal is turned on and the power source potential $V_{cc}$ appears on the other connecting terminal. At this time, the PMOS type transistor whose gate electrode is connected to the connecting terminal at which the power source potential $V_{cc}$ appears is turned off. Namely, when one of the two connecting terminals is set to the logic "0", the other is essentially set to the logic "1". The logic "1" is assured to be the power source potential $V_{cc}$. If it were not for the level build-up circuits 13 to 15, since the first and second circuits 11 and 12 consist of NMOS type transistors, the level of the logic "1" appearing at the drain would be no more than the value of $(V-V_{TH})$ which is less than $V_{cc}$, where $V_{TH}$ is the threshold potential and V is the source input voltage of the NMOS type transistor.

The logic "1" which is lower than the power source potential $V_{cc}$ causes the electric power consumption to be increased or causes the margin for noises to be reduced because in the device supplied with such level signal, a DC current flows from the power source potential $V_{cc}$ to the ground potential GND. The level build-up circuits 13–15 assure that the level of the logic "1" is kept at the power source potential $V_{cc}$.

Next, the first XNOR signal from the signal line 201, the first XOR signal from the signal line 202, and a carry-in signal $C_{in}$ and its inverse signal $\overline{C_{in}}$ as a pair of complementary carry-in signals which are respectively applied to the terminals 5 and 6 are supplied to the second circuit 12. Thus, the second XOR signal is provided to the signal line 203 and the second XNOR signal is provided to the signal line 204. FIG. 4 shows the relationships between inputs ($C_{in}$, $\overline{C_{in}}$) and (the first XNOR, the first XOR) and outputs (the second XOR, the second XNOR). The level build-up circuit 14 that assures the "1" level is connected to the signal lines 203 and 204. The second XOR signal from the signal line 203 and the second XNOR signal from the signal line 204 are respectively fed to the inverting amplifiers 16 and 17. Thus, the sum signal S and its inverse signal $\overline{S}$ are supplied as a pair of complementary sum signals from the inverting amplifiers 16 and 17 to the terminals 7 and 8, respectively.

The carry-in signal $C_{in}$ and its inverse signal $\overline{C_{in}}$ applied to the respective terminals 5 and 6 are also supplied to the transmission gate circuits 20 and 21. The transmission gate circuits 20 and 21 are simultaneously opened or closed by the first XNOR signal of the signal line 201 and the first XOR signal of the signal line 202 (since the first XNOR signal is the inverse of the first XOR signal and vice versa, the transmission gate circuits 20 and 21 may be controlled by one of the first XNOR and XOR signal). In response to the opening/closing states of the transmission gate circuits 20 and 21, the carry-in signal $C_{in}$ and its inverse signal $\overline{C_{in}}$ are directly delivered to the respective signal lines 205 and 206 or such signals are blocked. When the carry-in signal $C_{in}$ and its inverse signal $\overline{C_{in}}$ are blocked by the transmission gate circuits 20 and 21, a carry generating signal and carry killing signal are generated in the carry signal killing circuit 22 and carry signal generating circuit 23 on the signal line 205 or 206 in accordance with the pair of augend signals A and $\overline{A}$ and the pair of addend signals B and $\overline{B}$. FIG. 5 shows states of the signal lines 205 and 206 which are changed by the augend signal A and addend signal B. It is to be noted that the output (205) of the carry signal killing circuit 22 is the "0" level when both the inputs $\overline{A}$ and $\overline{B}$ are the "1" level and the output (206) of the carry generating circuit is the "1" level when both the inputs A and B are the "0" level.

The level build-up circuit 15 for assuring the "1" level and the inverting amplifiers 18 and 19 are connected to the signal lines 205 and 206, respectively. A carry-out signal $\overline{CO}$ and its inverse signal CO are provided as a pair of complementary carry-out signals from the inverting amplifiers 18 and 19 and supplied to the terminals 9 and 10, respectively.

With the above arrangement, since it is not necessary for the inverse signal to be formed in the full adder itself, the delay which would be introduced during the adder operation by the formation of the inverse signal is avoided.

In the above embodiment, the first and second circuits 11 and 12 have been constituted as shown in FIG. 2. However, they can be arbitrarily constituted with any types of XOR and XNOR circuits.

The "0" level signal has been generated by the carry signal cancelling circuit 22 and carry signal generating circuit 23. However, these circuits may be modified so as to generate a "1" level signal. Similarly, the level which is assured by the level build-up circuits 13 to 15 is not limited to the "1" level. The circuits may be modified so as to assume "0" level or both "1" and "0" levels.

As described above, according to the present invention, a full adder comprises: a first circuit for receiving a pair of complementary addend signals and a pair of complementary augend signals and for providing a first exclusive OR signal and a first exclusive NOR signal; a second circuit for receiving the first exclusive OR signal, the first exclusive NOR signal, and a pair of complementary carry-in signals and for providing a second exclusive OR signal and a second exclusive NOR signal as a pair of complementary sum signals; first and second gate circuits for causing the pair of complementary carry-in signals to be passed or blocked in response to at least one of the first exclusive OR signal and the first exclusive NOR signal; and a carry signal generating circuit and a carry signal killing circuit for generating a carry generating signal and a carry killing signal by using the pair of addend signals and the pair of augend signals when the first and second gate circuits are closed. With such arrangement, an effect is provided whereby the inverse signal does not need to be formed in the full adder and the full adder operation can be performed at a high speed.

What is claimed is:

1. A full adder comprising:
    a first circuit for receiving a pair of complementary addend signals and a pair of complementary augend signals and for providing a first exclusive OR signal and a first exclusive NOR signal;
    a second circuit for receiving the first exclusive OR signal, the first exclusive NOR signal, and a pair of complementary carry-in signals and providing a second exclusive OR signal and a second exclusive NOR signal as a pair of complementary sum signals;
    first and second gate circuits for receiving a pair of complementary carry-in signals which are passed or blocked in response to at least one of the first exclusive OR signal and the first exclusive NOR signal; and
    a carry signal generating circuit and carry signal canceling circuit coupled from said first and second gate circuits, respectively, for providing a pair of complementary carry-out signals under control of the pair of complementary addend signals and a pair of complementary augend signals when the pair of complementary carry-in signals are blocked by the first and second gate circuits, and for providing the pair of complementary carry-in signals as the pair of complementary carry-out signals when the pair of complementary carry-in signals are passed by the first and second gate circuits.

2. A full adder according to claim 1 wherein said first circuit comprises first, second, third and fourth MOS type transistors, the source electrodes of the first and second MOS transistors receiving one of the pair of complementary addend signals, the source electrodes of the third and fourth MOS transistors receiving the other of the pair of complementary addend signals, the gate electrodes of the first and fourth MOS transistors receiving one of the pair of complementary augend signals, the gate electrodes of the second and third MOS transistors receiving the other of the pair of complementary augend signals, the drain electrodes of the first and third MOS transistors providing one of the first XNOR and XOR signals, and the drain electrodes of the second and fourth MOS transistors providing the other of the first XNOR and XOR signals.

3. A full adder according to claim 2 wherein said second circuit comprises first, second, third and fourth MOS type transistors, the source electrodes of the first and second MOS transistors receiving one of the first XNOR and XOR signals, the source electrodes of the third and fourth MOS transistors receiving the other of the first XNOR and XOR signals, the gate electrodes of the first and fourth MOS transistors receiving one of the pair of complementary carry-in signals, the gate electrodes of the second and third MOS transistors receiving the other of the pair of complementary carry-in signals, the drain electrodes of the first and third MOS transistors providing one of the second XNOR and XOR signals, and the drain electrodes of the second and fourth MOS transistors providing the other of the second XNOR and XOR signals.

4. A full adder according to claim 1 further comprising level build-up circuits connected to the output of said first circuit, the output of said second circuit, and the outputs of said first and second gate circuits.

5. A full adder according to claim 4, wherein each of said level build-up circuits comprises two PMOS type transistors, their source electrodes being connected to a power source potential and the gate electrode of each transistor being connected to the drain electrode of the other transistor.

6. An adder circuit comprising:
    a first pair of input terminals for receiving a pair of complementary addend signals; a second pair of input terminals for receiving a pair of complementary augend signals, and a third pair of input terminals for receiving a pair of complementary carry-in signals;
    a first circuit coupled from said first pair of input terminals and said second pair of input terminals for receiving both said pair of complementary addend signals and said pair of complementary addend signals and said pair of complementary augend signals and for providing a first exclusive OR signal and a first exclusive NOR signal;

a second circuit coupled from said third pair of input terminals and said first circuit for receiving the first exclusive OR signal and the first exclusive NOR signal from said first circuit, and said pair of complementary carry-in signals from said third pair of input terminals and for providing a second, exclusive OR signal and a second exclusive NOR signal defining a respective pair of complementary sum signals;

a carry signal generating circuit and a carry signal canceling circuit coupled from said first and second gate circuits, respectively, for providing a pair of complementary carry-out signals under control of the pair of complementary addend signals and a pair of complementary augend signals when the pair of complementary carry-in signals are blocked by the first and second gate circuits, and for providing the pair of complementary carry-in signals as the pair of complementary carry-out signals when the pair of complementary carry-in signals are passed by the first and second gate circuits.

7. An adder circuit as set forth in claim 6 wherein said first circuit comprises first, second, third and fourth MOS type transistors, the source electrodes of the first and second MOS transistors receiving one of the pair of complementary addend signals, the source electrodes of the third and fourth MOS transistors receiving the other of the pair of complementary addend signals, the gate electrodes of the first and fourth MOS transistors receiving one of the pair of complementary augend signals, the gate electrodes of the second and third MOS transistors receiving the other of the pair of complementary augend signals, the drain electrodes of the first and third MOS transistors providing one of the first XNOR and XOR signals, and the drain electrodes of the second and fourth MOS transistors providing the other of the first XNOR and XOR signals.

8. An adder circuit as set forth in claim 7 wherein said second circuit comprises first, second, third and fourth MOS type transistors, the source electrodes of the first and second MOS transistors receiving one of the first XNOR and XOR signals, the source electrodes of the third and fourth MOS transistors receiving the other of the first XNOR and XOR signals, the gate electrodes of the first and fourth MOS transistors receiving one of the pair of complementary carrying-in signals, the gate electrodes of the second and third MOS transistors receiving the other of the pair of complementary carrying-in signals, the drain electrodes of the first and third MOS transistors providing one of the second XNOR and XOR signals, and the drain electrodes of the second and fourth MOS transistors providing the other of the second XNOR and XOR signals.

9. An adder circuit as set forth in claim 6 further comprising level build-up circuits connected to the output of said first circuit, the output of said second circuit, and the outputs of said first and second gate circuits.

10. An adder circuit as set forth in claim 9, wherein each of said level build-up circuits comprises two PMOS type transistors, their source electrodes being connected to a power source potential and the gate electrode of each transistor being connected to the drain electrode of th other transistor.

11. A full adder comprising:
a first circuit for receiving a pair of complementary addend signals and a pair of complementary augend signals and for providing a first exclusive OR signal and a first exclusive NOR signal;

a second circuit for receiving the first exclusive OR signal, the first exclusive NOR signal, and a pair of complementary carry-in signals and for providing a second exclusive OR signal and a second exclusive NOR signal as a pair of complementary sum signals;

first and second gate circuits for receiving a pair of complementary carry-in signals which are passed or blocked in response to at least one of the first exclusive OR signal and the first exclusive NOR signal;

carry-out circuit means having a pair of complementary carry-out signal terminals; and a carry signal circuit means intercoupling the first and second gate circuits and the carry-out circuit means;

said carry signal circuit means responsive to said complementary augend and complementary carry-out signals to provide predetermined complementary carry-out signals at said complementary carry-out signal terminals based upon said complementary augend and addend signals when said first and second gate circuits are blocked.

12. A full adder according to claim 11, wherein said carry signal circuit means comprises a carry signal generating circuit and signal canceling circuit coupled from said firsts and second gate circuits, respectively.

13. A full adder according to claim 11, wherein the pair of complementary carry-in signals are provided as the pair of complementary carry-out signals when the pair of complementary carry-in signals are passed by the first and second gate circuits.

14. A full adder according to claim 11, wherein said first circuit comprises first, second, third, and fourth MOS type transistors, the source electrodes of the first and second MOS transistors receiving one of the pair of complementary addend signals, the source electrodes of the third and fourth MOS transistors receiving the other of the pair of complementary addend signals, the gate electrodes of the second and third MOS transistors providing one of the first XNOR and XOR signals, and the drain electrodes of the second and fourth MOS transistors providing the other of the first XNOR and XOR signals.

15. A full adder according to claim 14, wherein said second circuit comprises first, second, third, and fourth MOS type transistors, the source electrodes of the first and second MOS transistors receiving one of the first XNOR and XOR signals, the source electrodes of the third and fourth MOS transistors receiving the other of the first XNOR and XOR signals, the gate electrodes of the first and fourth MOS transistors receiving one of the pair of complementary carry-in signals, the gate electrodes of the second and third MOS transistors receiving the other of the pair of complementary carry-in signals, the drain electrodes of the first and third MOS transistors providing one of the second XNOR and XOR signals, and the drain electrodes of the second and fourth MOS transistors providing the other of the second XNOR and XOR signals.

16. A full adder according to claim 11 further comprising level build-up circuits connected to the output of said first circuit, the output of said second circuit, and the outputs of said first and second gate circuits.

17. A full adder according to claim 16, wherein each of said level build-up circuits comprises two PMOS type transistors, their source electrodes being connected to a power source potential and the gate electrode of each transistor being connected to the drain electrode of the other transistor.

* * * * *